United States Patent
Aflatouni et al.

(10) Patent No.: US 10,795,188 B2
(45) Date of Patent: Oct. 6, 2020

(54) THERMALLY ENHANCED FAST OPTICAL PHASE SHIFTER

(71) Applicant: California Institute of Technology, Pasadena, CA (US)

(72) Inventors: Firooz Aflatouni, Philadelphia, PA (US); Seyed Ali Hajimiri, La Canada, CA (US)

(73) Assignee: CALIFORNIA INSTITUTE OF TECHNOLOGY, Pasadena, CA (US)

( * ) Notice: Subject to any disclaimer, the term of this patent is extended or adjusted under 35 U.S.C. 154(b) by 0 days.

(21) Appl. No.: 15/728,329

(22) Filed: Oct. 9, 2017

(65) Prior Publication Data

US 2018/0101032 A1    Apr. 12, 2018

Related U.S. Application Data

(60) Provisional application No. 62/405,432, filed on Oct. 7, 2016.

(51) Int. Cl.
*G02F 1/015* (2006.01)
*G02F 1/01* (2006.01)
*G02F 1/225* (2006.01)

(52) U.S. Cl.
CPC ........ *G02F 1/0147* (2013.01); *G02F 2201/46* (2013.01); *G02F 2203/21* (2013.01)

(58) Field of Classification Search
CPC . G02F 1/0147; G02F 2201/46; G02F 2203/21
(Continued)

(56) References Cited

U.S. PATENT DOCUMENTS

| | | | |
|---|---|---|---|
| 4,686,533 A | 8/1987 | MacDonald et al. |
| 4,833,336 A | 5/1989 | Kraske |

(Continued)

FOREIGN PATENT DOCUMENTS

| | | | |
|---|---|---|---|
| WO | WO 2018/148758 A1 | 8/2018 |
| WO | WO 2018/165633 A1 | 9/2018 |

OTHER PUBLICATIONS

Bliss, et al., "Multiple-Input Multiple-Output (MIMO) Radar and Imaging: Degrees of Freedom and Resolution," *Signals, Systems, and Computers (Asilomar) Conference*, pp. 54-59, (2003).

(Continued)

*Primary Examiner* — Eric Wong
(74) *Attorney, Agent, or Firm* — Alston & Bird LLP

(57) ABSTRACT

An optical phase shifter includes, in part, a waveguide, a heating element adapted to heat the waveguide, and a cooling element adapted to cool the waveguide. The heating element may be integrated within a substrate in which the waveguide is formed. The cooling element is biased to maintain the temperature of the waveguide within a predefined range characterized by a substantially high gradient of the thermal constant of the waveguide. The optical phase shifter may optionally include a substrate on which the waveguide is positioned. The substrate may include, in part, through substrate vias for supplying electrical signals to the cooling element. A control circuit supplies electrical signals to the heating and cooling elements. The control circuit may maintain the cooling element and heating element on concurrently. Alternatively, the control circuit may turn off the cooling element before turning on the heating element.

13 Claims, 3 Drawing Sheets

(58) Field of Classification Search
USPC .......................................................... 385/1
See application file for complete search history.

(56) References Cited

U.S. PATENT DOCUMENTS

| | | | |
|---|---|---|---|
| 6,424,442 B1 | 7/2002 | Gfeller et al. | |
| 6,894,550 B2 | 5/2005 | Trosa et al. | |
| 7,313,295 B2 | 12/2007 | Ghandi et al. | |
| 7,623,783 B2 | 11/2009 | Morris et al. | |
| 8,244,134 B2 | 8/2012 | Santori et al. | |
| 8,311,417 B1 | 11/2012 | Poggiolini et al. | |
| 9,325,419 B1 | 4/2016 | Kato | |
| 9,557,585 B1 | 1/2017 | Yap et al. | |
| 10,382,140 B2 | 8/2019 | Fatemi et al. | |
| 2002/0174660 A1* | 11/2002 | Venkatasubramanian | B01L 7/52 62/3.7 |
| 2003/0090775 A1* | 5/2003 | Webb | G02F 1/011 359/279 |
| 2004/0071386 A1* | 4/2004 | Nunen | G02B 6/12007 385/14 |
| 2004/0101227 A1* | 5/2004 | Takabayashi | G02F 1/0136 385/11 |
| 2004/0141753 A1 | 7/2004 | Andreu-von Euw et al. | |
| 2005/0084213 A1* | 4/2005 | Hamann | B82Y 20/00 385/40 |
| 2005/0138934 A1* | 6/2005 | Weigert | G02B 6/4201 62/3.2 |
| 2006/0056845 A1* | 3/2006 | Parsons | H04L 27/223 398/41 |
| 2008/0111755 A1 | 5/2008 | Haziza et al. | |
| 2008/0181550 A1* | 7/2008 | Earnshaw | G02F 1/0147 385/1 |
| 2009/0297092 A1* | 12/2009 | Takahashi | G02F 1/0147 385/14 |
| 2010/0054653 A1* | 3/2010 | Carothers | G02B 6/136 385/1 |
| 2010/0158521 A1 | 6/2010 | Doerr et al. | |
| 2010/0187402 A1 | 7/2010 | Hochberg et al. | |
| 2010/0226658 A1* | 9/2010 | Fujimoto | H04B 10/677 398/141 |
| 2011/0064415 A1 | 3/2011 | Williams et al. | |
| 2012/0087613 A1* | 4/2012 | Rasras | G02F 1/0147 385/1 |
| 2012/0207428 A1* | 8/2012 | Roelkens | G02B 6/2793 385/14 |
| 2012/0213531 A1* | 8/2012 | Nazarathy | H03M 1/145 398/202 |
| 2013/0107667 A1 | 5/2013 | Boufounos | |
| 2015/0009068 A1 | 1/2015 | Gregoire et al. | |
| 2015/0198713 A1 | 7/2015 | Boufounos et al. | |
| 2015/0336097 A1* | 11/2015 | Wang | B01L 3/502761 435/30 |
| 2015/0357710 A1 | 12/2015 | Li et al. | |
| 2016/0170141 A1* | 6/2016 | Luo | H01S 5/141 385/14 |
| 2016/0172767 A1 | 6/2016 | Ray | |
| 2016/0266414 A1* | 9/2016 | Gill | G02F 1/011 |
| 2016/0276803 A1* | 9/2016 | Uesaka | H01S 5/02256 |
| 2017/0041068 A1 | 2/2017 | Murakowski et al. | |
| 2017/0131576 A1* | 5/2017 | Gill | G02B 6/136 |
| 2017/0315387 A1 | 11/2017 | Watts et al. | |
| 2017/0324162 A1 | 11/2017 | Khachaturian et al. | |
| 2018/0101083 A1 | 4/2018 | Aflatouni et al. | |
| 2018/0123699 A1 | 5/2018 | Fatemi et al. | |
| 2018/0173025 A1* | 6/2018 | McGreer | G02F 1/0147 |
| 2019/0056499 A1 | 2/2019 | Fatemi et al. | |
| 2019/0089460 A1 | 3/2019 | Khachaturian et al. | |

OTHER PUBLICATIONS

Bogaerts, et al., "Low-loss, low-cross-talk crossings for silicon-on-insulator nanophotonic waveguides," *Optics Letters*, 32(19): 2801-2803, (2007).

Katz, et al., "Diffraction coupled phase-locked semiconductor laser array," *Appl. Phys. Lett.*, 42(7): 554-556, (1983).

Liang, et al., "Tiled-aperture coherent beam combining using optical phase-lock loops," *Electronics Letters*, 44(14), (2008).

Resler, et al., "High-efficiency liquid-crystal optical phased-array beam steering," *Opt. Lett.*, 21(9): 689-691, (1996).

Vaidyanathan, et al., "Sparse sensing with coprime arrays," *Signals, Systems, and Computers (Asilomar) Conference*, pp. 1405-1409, (2010).

U.S. Appl. No. 15/616,844, Non-Final Office Action dated Jun. 1, 2018.

WIPO Application No. PCT/US2018/018070, PCT International Search Report and Written Opinion of the International Searching Authority dated Apr. 27, 2018.

WIPO Application No. PCT/US2018/021882, PCT International Search Report and Written Opinion of the International Searching Authority dated Jun. 7, 2018.

U.S. Appl. No. 15/616,844, Response to Non-Final Office Action filed Dec. 3, 2018.

U.S. Appl. No. 15/587,391, Non-Final Office Action dated Dec. 13, 2018.

U.S. Appl. No. 15/896,005, Ex Parte Quayle Action mailed Apr. 29, 2020.

U.S. Appl. No. 15/917,536, Final Office Action dated May 14, 2020.

U.S. Appl. No. 15/587,391, Non-Final Office Action dated Mar. 19, 2020.

U.S. Appl. No. 15/587,391, Final Office Action dated Aug. 15, 2019.

U.S. Appl. No. 15/616,844, Notice of Allowance dated Mar. 27, 2019.

U.S. Appl. No. 15/728,245, Non-Final Office Action dated Apr. 17, 2019.

U.S. Appl. No. 15/917,536, Non-Final Office Action dated Aug. 7, 2019.

U.S. Appl. No. 15/917,536, Requirement for Restriction/Election dated Feb. 11, 2019.

WIPO Application No. PCT/US2018/018070, PCT International Preliminary Report on Patentability dated Aug. 13, 2019.

WIPO Application No. PCT/US2018/021882, PCT International Preliminary Report on Patentability dated Sep. 10, 2019.

U.S. Appl. No. 15/728,245, Final Office Action dated Dec. 6, 2019.

\* cited by examiner

US 10,795,188 B2

THERMALLY ENHANCED FAST OPTICAL PHASE SHIFTER

CROSS REFERENCE TO RELATED APPLICATIONS

The present application claims benefit under 35 USC 119 (e) of U.S. provisional application No. 62/405,432, filed Oct. 7, 2016, entitled "Thermally Enhanced Fast Optical Phase Shifter", the content of which is incorporated herein by reference in its entirety.

FIELD OF THE INVENTION

The present invention is related to controlling the phase of an optical signal in a photonic device.

BACKGROUND OF THE INVENTION

Optical phase shifting is widely used in many photonics devices, such as optical modulators, Mach-Zehnder interferometers, coherent receivers/transmitters, and optical phased arrays. One conventional technique for phase shifting/modulation is electro-absorption modulation in accordance with which the charge carrier density is varied to cause a change in the refractive index. Because the charge carrier concentration may be varied rapidly, electro-absorption modulation is relatively fast. However, the technique suffers from a higher optical loss and/or phase-shift dependent loss. A need continues to exist for fast phase shifting in photonics devices.

BRIEF SUMMARY OF THE INVENTION

An optical phase shifter, in accordance with one embodiment of the present invention, includes, in part, a waveguide, a heating element adapted to supply heat to the waveguide, and a cooling element adapted to cool the waveguide. In one embodiment, the heating element is integrated within a substrate in which the waveguide is formed. In one embodiment, the cooling element is biased to maintain the temperature of the waveguide within a predefined range. In one embodiment, the predefined range is characterized by a substantially high gradient of the thermal constant of the waveguide.

The optical phase shifter, in accordance with one embodiment, further includes, in part, a substrate on which the waveguide is positioned. The substrate includes, in part, through substrate vias for supplying electrical signals to the cooling element. The optical phase shifter further includes, in part, a control circuit adapted to supply and control electrical signals to the heating and cooling elements. In one embodiment, the control circuit maintains the cooling element and heating element on concurrently. In one embodiment, the control circuit turns off the cooling element when the control circuit turns on the heating element.

A method of shifting a phase of an optical signal travelling through a waveguide includes, in part, cooling the waveguide to maintain the temperature of the waveguide within a predefined range, and heating the waveguide while the temperature of the waveguide remains within the predefined range. In one embodiment, the method further includes, in part, forming the waveguide and a heating element heating the waveguide within a semiconductor substrate. In one embodiment, the predefined range is characterized by a substantially high gradient of the thermal constant of the waveguide.

In one embodiment, the method further includes, in part, positioning the waveguide on a substrate that includes, in part, through substrate vias for supplying electrical signals to the cooling element. In one embodiment, the method further includes, in part, supplying electrical signals to the heating and cooling elements from a control circuit. In one embodiment, the method further includes, in part, heating and cooling the waveguide concurrently. In one embodiment, the method further includes, in part, heating the waveguide during a time period when the waveguide is not being cooled.

BRIEF DESCRIPTION OF THE DRAWINGS

The present application contains at least one drawing executed in color. Copies of this patent application with color drawing(s) will be provided by the Office upon request and payment of the necessary fee.

DETAILED DESCRIPTION OF THE INVENTION

As is well known, different materials have different thermo-optic coefficients. For example, the thermo-optic coefficient, $d_n/d_T$ for silicon at 1550 nm wavelength is about $1.86 \times 10^{-4}$ K, where n is the refractive index and T is temperature in Kelvin. By changing the local temperature of a waveguide, that may be formed using Silicon or other materials, the index of refraction of the material from which the waveguide is made changes, thus resulting in effective optical phase shift across the waveguide.

While fast phase shifters with low power requirements are desirable, it is difficult to achieve high frequency bandwidth for a low power design. This can be seen from power-speed relationship defined by:

$$P = H \cdot E \cdot \Delta T \qquad (1)$$

In equation (1), H is the heat capacity, $\tau$ is the thermal time constant, and $\Delta T$ and P are respectively the change in temperature and power dissipation required to achieve a $\pi$ phase shift. Even if the power dissipation is relatively high, the relatively large thermal time constant of a thermal phase shifter makes the modulation bandwidth limited to sub-MHz.

Figure 1:
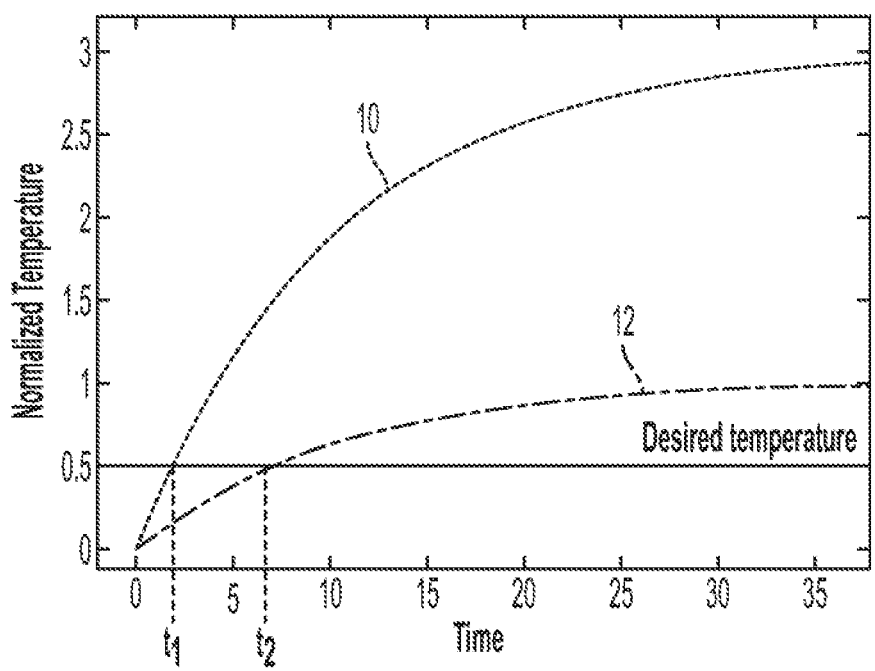
FIG. 1 shows the change in the temperatures of two different waveguides as a function of time, as known in the prior art.

Plots 10 and 12 of FIG. 1 show the changes in normalized temperatures of two different waveguides as a function of time. As is seen from the plots, the thermal time constant of the waveguide characterized by plot 10 at the normalized temperatures above nearly 2.5 is substantially similar to the thermal time constant of the waveguide characterized by plot 12 at the normalized temperatures above nearly 0.75. In other words, at or above such temperatures, it takes a relatively long time to change the temperature of the waveguides to achieve phase modulation. Therefore, changing the index of refraction of a waveguide by heating the waveguide as is done conventionally is slow.

In accordance with embodiments of the present invention, a waveguide is adapted to include both a heater and a cooler so as to change the index of refraction of a thermal phase shifter, such as a waveguide, by both heating and cooling the waveguide, as described further below.

Figure 2:
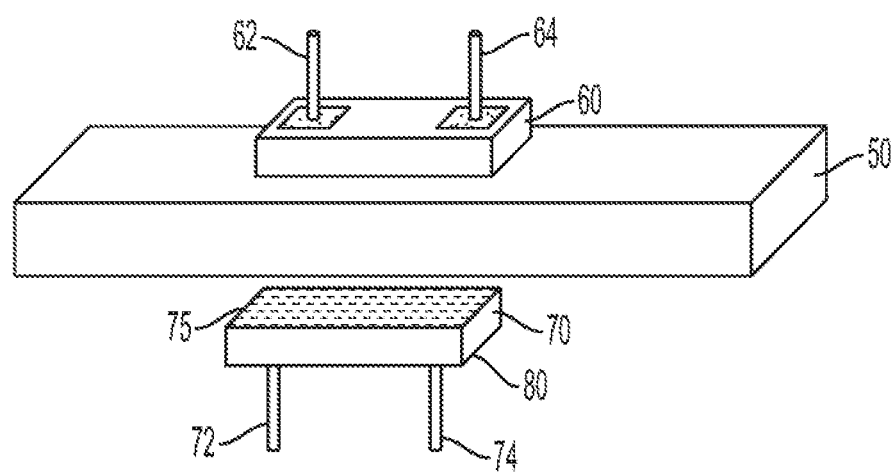
FIG. 2 is a simplified schematic diagram of a waveguide including a heating element and a cooling element, in accordance with one embodiment of the present invention.

FIG. 2 is a simplified schematic diagram of a waveguide 50 formed in, for example, a silicon substrate, in accordance with one embodiment of the present invention. Waveguide 50 is shown as including a heating element 60 positioned above the waveguide, and a cooling element 70 positioned below the waveguide. In one embodiment, heating element 60 generates heat in response to electrical current flowing between its terminals 62 and 64. In one embodiment, cooling element 60 is a thermoelectric cooler that operates based on the Peltier effect. Accordingly, when a voltage difference is applied between the two terminals 72 and 74 of cooling element 70, heat is transferred from the upper surface 75 of the cooling element that is in contact with the waveguide to bottom surface 80 of the waveguide thereby transferring the heat away from the waveguide to cool the waveguide.

The voltage applied to cooling element 80 is selected so as to maintain the temperature of the waveguide within a range that has a relatively high gradient associated with the waveguide's thermal constant. For example, assume waveguide 50 has a thermal time constant characterized by plot 10 as shown in FIG. 1. As is seen, the thermal time constant 10 has a higher slope at the normalized temperature between 0 and 0.5 degrees. Accordingly, cooling element 50 maintains the normalized temperature of the waveguide within the range of 0 and 0.5 In one example, the normalized temperature range of 0.5 to 3.0 may correspond to a temperature range of 100° C. Because the gradient of the temperature vs. time for the waveguide is higher at the normalized values below 0.5, which the cooling element is biased to maintain, any heat supplied by the heater to the waveguide causes a relatively fast increase in the temperature of the waveguide, thereby shifting the phase of the optical signal travelling through the waveguide in a relatively short time period.

Figure 3:
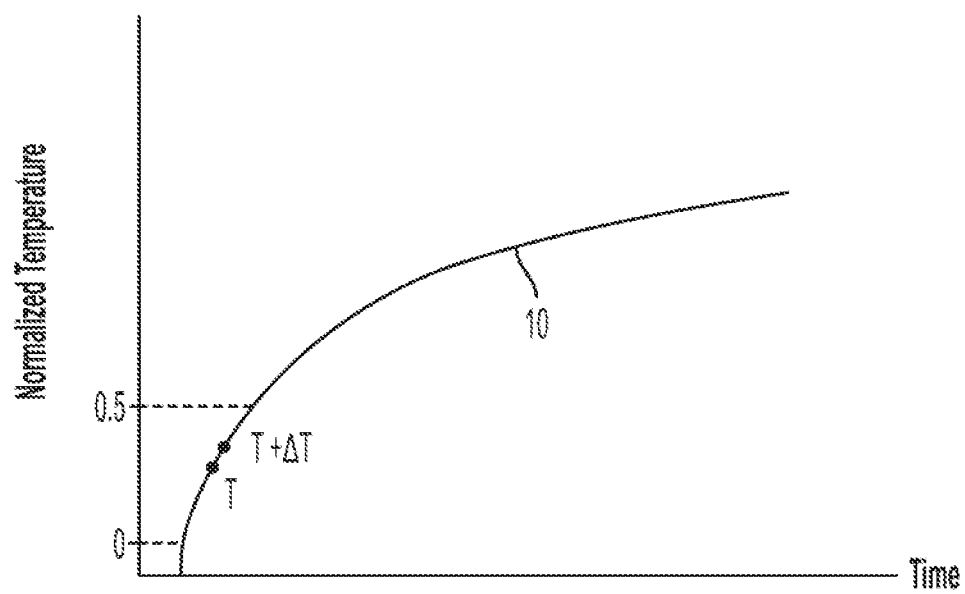
FIG. 3 shows a selected temperature range of a waveguide, in accordance with one embodiment of the present invention.

FIG. 3 shows exemplary plot 10 assumed to be associated with waveguide 50 of FIG. 2 in which the normalized temperature range between 0 and 0.5 is seen as having nearly the highest slope. Assume that the cooling element maintains the waveguide temperature at temperature T within this range as shown. To shift the phase of the optical signal travelling through the waveguide, the heating element 60 is turned on thereby causing the waveguides temperature to increase to T+ΔT. Because the slope of the plot 10 in the region defined between normalized values of 0 and 0.5 is higher than the slope at normalized values of above 0.5, the temperature of the waveguide rises quickly to shift the phase of the optical signal passing through the waveguide. In other words, when the heating element 50 is turned on, a large thermal gradient is achieved across the waveguide thus resulting in a fast temperature increase. When the heating element is turned off, the cooling element quickly cools down the waveguide. The relatively large thermal gradient and fast cool down results is a thermo-optic modulation speed with estimated bandwidth much higher than conventional modulators which only use a heater.

Figure 4:
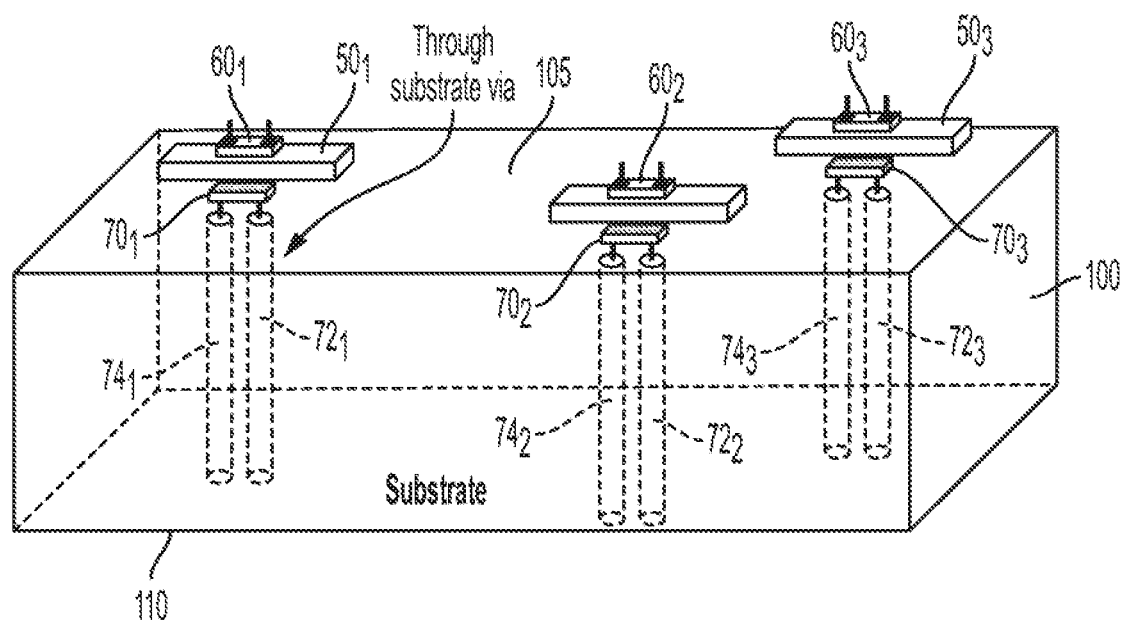
FIG. 4 is a simplified schematic diagram of a number of exemplary waveguides positioned on a substrate with each waveguide including a heating element and a cooling element, in accordance with one embodiment of the present invention.

In one embodiment, the cooling element 70 may be turned off when the heating element 60 is turned on. Cooling element 70 may be continuously or periodically biased to keep the local temperature of the waveguide low and within the desired range where the thermal time constant of the waveguide is nearly the highest. In one embodiment (not shown), the heating element is integrated within the same Semiconductor (e.g., Silicon) substrate in which the waveguide is formed FIG. 4 is a simplified schematic diagram of a number of exemplary waveguides $50_i$, positioned on a substrate 100. Three such waveguides $50_i$, where i is an index ranging from 1 to 3 in this exemplary embodiment, are shown. Each waveguide $50_i$ is shown as including an associated heating element $60_i$ and an associated cooling element $70_i$. Substrate 100 is adapted to receive the bottom surfaces 80 of the cooling elements on its top surface 105. Also associated with each waveguide, is a pair of through semiconductor vias $72_i$ and $74_i$ formed in substrate 100 through which electrical signals are supplied to the cooling element. This enables a voltage to be applied across the two terminals of each cooling element $70_i$ from the bottom side 110 of substrate 100

Figure 5:
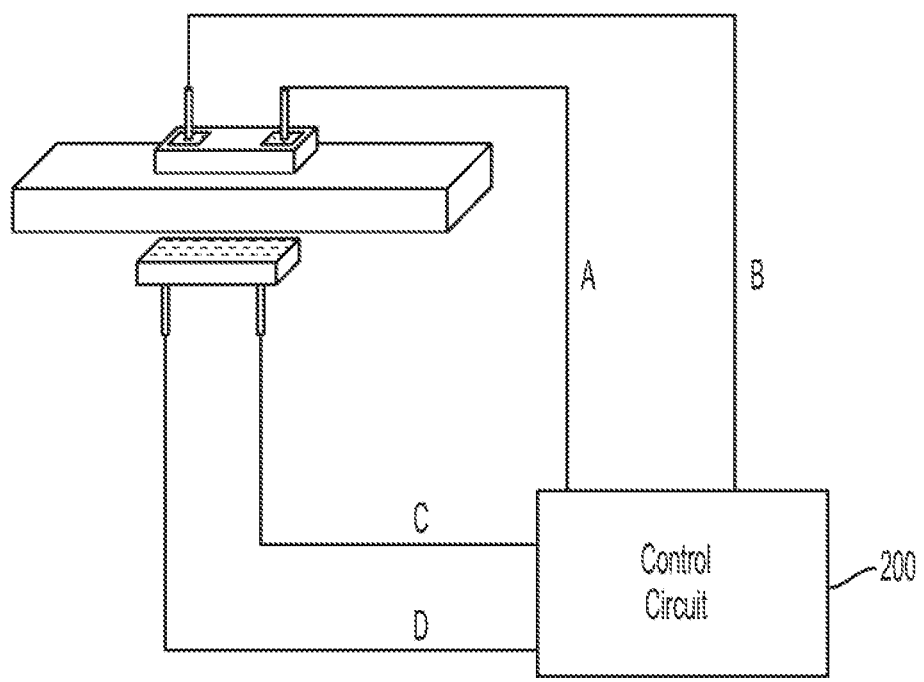
FIG. 5 shows a control circuit adapted to control and apply electrical signals to heating element and cooling element of a waveguide, in accordance with one embodiment of the present invention.

FIG. 5 shows a control circuit 200 adapted to control and apply electrical signals to heating element 60 and cooling element 70 of waveguide 50. Electrical signals A and B control the amount of heat supplied by heating element 60 to waveguide 50, and electrical signals C and D control the amount of heat removed from waveguide 50 by cooling element 60. In some embodiments, not shown, one or more feedback signals may be used to vary signals A, B, C and D.

The above embodiments of the present invention are illustrative and not limitative. Embodiments of the present invention are not limited by the type of waveguide, heating element or cooling element. Embodiments of the present invention are not limited by the wavelength of the optical signal, nor are they limited by the type of substrate, semiconductor or otherwise, in which the waveguide and the heating element may be formed. Other additions, subtractions or modifications are obvious in view of the present disclosure and are intended to fall within the scope of the appended claims.

What is claimed is:

1. An optical phase shifter comprising:
   a waveguide;
   a heating element adapted to supply heat to the waveguide and positioned along a first side of the waveguide; and
   a cooling element adapted to cool the waveguide and positioned along a second side of the waveguide, wherein said heating element is integrated within a substrate in which the waveguide is formed.

2. The phase shifter of claim 1 wherein said cooling element is biased to maintain the temperature of the waveguide within a predefined range.

3. The phase shifter of claim 2 wherein said predefined range is characterized by a substantially high gradient of the thermal constant of the waveguide.

4. The optical phase shifter of claim 1 further comprising a substrate on which the waveguide is positioned, said substrate comprising through substrate vias for supplying electrical signals to the cooling element.

5. The optical phase shifter of claim 1 further comprising a control circuitry adapted to supply and control electrical signals to the heating and cooling elements.

6. The optical phase shifter of claim 5 wherein said control circuitry maintains the cooling element and heating elements on concurrently.

7. The optical phase shifter of claim 5 wherein said control circuitry turns off the cooling element when the control circuitry turns on the heating element.

8. A method of shifting a phase of an optical signal travelling through a waveguide, the method comprising:
cooling the waveguide from a first side of the waveguide to maintain the temperature of the waveguide within a predefined range;
heating the waveguide from a second side of the waveguide while the temperature of the waveguide remains within the predefined range; and
forming the waveguide and a heating element heating the waveguide within a semiconductor substrate.

9. The method of claim 8 wherein said predefined range is characterized by a substantially high gradient of the thermal constant of the waveguide.

10. The method of claim 8 further comprising:
positioning the waveguide on a substrate comprising through substrate vias for supplying electrical signals to the cooling element.

11. The method of claim 8 further comprising:
supplying electrical signals to the heating and cooling elements from a control circuit.

12. The method of claim 8 further comprising:
heating and cooling the waveguide concurrently.

13. The method of claim 8 further comprising:
heating the waveguide during a time period when the waveguide is not being cooled.

* * * * *